(12) United States Patent
Bühn et al.

(10) Patent No.: US 10,138,993 B2
(45) Date of Patent: Nov. 27, 2018

(54) GEAR MOTOR

(71) Applicant: SEW-EURODRIVE GMBH & CO. KG, Bruchsal (DE)

(72) Inventors: Oliver Bühn, Kraichtal (DE); Miki Tegeltija, Karlsdorf-Neuthardt (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 379 days.

(21) Appl. No.: 14/904,004

(22) PCT Filed: Jun. 12, 2014

(86) PCT No.: PCT/EP2014/001593
§ 371 (c)(1),
(2) Date: Jan. 8, 2016

(87) PCT Pub. No.: WO2015/003770
PCT Pub. Date: Jan. 15, 2015

(65) Prior Publication Data
US 2016/0160991 A1  Jun. 9, 2016

(30) Foreign Application Priority Data
Jul. 9, 2013 (DE) .......................... 10 2013 011 385

(51) Int. Cl.
*F16H 57/02* (2012.01)
*F16H 57/025* (2012.01)

(52) U.S. Cl.
CPC . *F16H 57/025* (2013.01); *F16H 2057/02034* (2013.01)

(58) Field of Classification Search
CPC .......... F16H 57/03; F16H 2057/02034; F16H 57/033; F16H 57/025
See application file for complete search history.

(56) References Cited

U.S. PATENT DOCUMENTS

| 3,246,538 A | 4/1966 | Easton |
| 3,383,947 A | 5/1968 | Higgins |

(Continued)

FOREIGN PATENT DOCUMENTS

| CN | 101675274 A | 3/2010 |
| CN | 202107447 U | 1/2012 |

(Continued)

OTHER PUBLICATIONS

International Search Report, dated Aug. 20, 2014, issued in corresponding International Application No. PCT/EP2014/001593.

(Continued)

*Primary Examiner* — Thomas C Diaz
(74) *Attorney, Agent, or Firm* — Hunton Andrews Kurth LLP

(57) ABSTRACT

A gear unit motor having a gear unit and an electric motor which drives the gear unit, the electric motor having a rotor shaft, which is disposed so as to allow a rotation about its rotor shaft axis, the gear unit having a first housing part and a second housing part, the second housing part having a square flange, the first housing part having a round flange facing the motor and a square flange facing the second gear unit housing part, in particular the square flange of the second housing part, the round flange and the square flange of the first housing part being connected by an interposed connection section, the connection section of the first housing part having projections in one surface section, in particular projections that extend parallel to the direction of the rotor shaft axis when viewed in the circumferential direction.

16 Claims, 4 Drawing Sheets

(56) References Cited

U.S. PATENT DOCUMENTS 3,774,477 A     11/1973   Murphy
5,645,363 A *   7/1997   Dafforn .................. B60K 17/28
                                                                                          403/3

FOREIGN PATENT DOCUMENTS

| DE | 100 61 501      | 6/2002  |
|----|-----------------|---------|
| DE | 21 2004 000 026 | 4/2006  |
| DE | 10 2007 014 707 | 9/2008  |
| JP | 2001-304348     | 10/2001 |

OTHER PUBLICATIONS

International Preliminary Report on Patentability, dated Jan. 12, 2016, issued in corresponding International Application No. PCT/EP2014/001593.

* cited by examiner

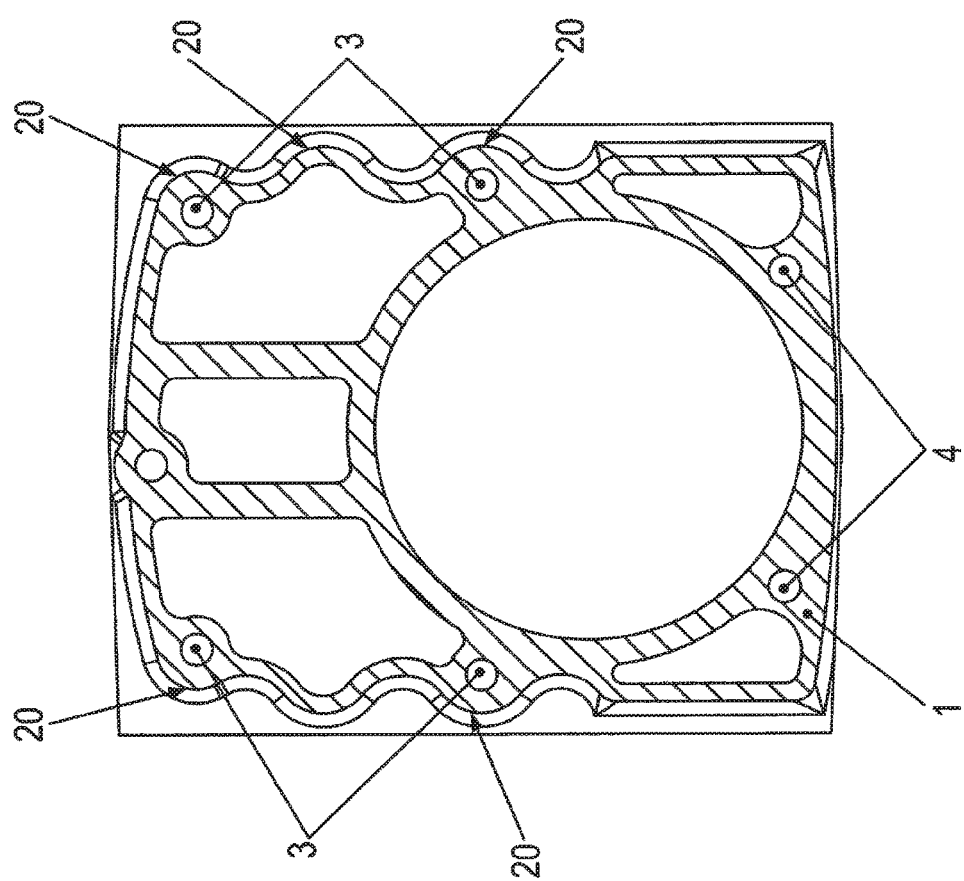

GEAR MOTOR

FIELD OF THE INVENTION

The present invention relates to a gear motor.

BACKGROUND INFORMATION

It is generally known that the gear housing is connected to the motor housing in a gear motor.

SUMMARY

The present invention is therefore based on the objective of further refining a gear motor such that it is able to be produced in a cost-effective and uncomplicated manner.

Features of the gear motor are that the gear motor includes a gearing and an electric motor which drives the gear unit, the electric motor has a rotor shaft which is situated so as to allow it to rotate about its rotor shaft axis, the gear unit has a first housing part and a second housing part, the second housing part has a square flange, the first housing part has a round flange facing the motor and a square flange facing the second gear housing part, in particular the square flange of the second housing part, the round flange and the square flange of the first housing part are connected with the aid of an interposed connection section, the connection section of the first housing part has projections in one surface section, in particular projections that extend parallel to the direction of the rotor shaft axis when viewed in the circumferential direction, i.e., in particular from the round flange to the square flange, an individual fastening element is screwed into a threaded bore introduced into the square flange of the second housing part, and the motor housing exerts pressure on the first housing part, so that it presses against the second housing part, the particular fastening element is provided in a recess, which extends without interruption from the round flange of the first housing part to the square flange of the first housing part, and which is situated in the peripheral angle area, covered by one of the individual projections, in the same circumferential position, especially in relation to the rotor shaft axis and/or when viewed from the direction of the rotor shaft axis.

This is advantageous insofar as the fastening element is situated in a bore hole that penetrates the wall of the connection section. The bore hole is axially continuous. The fastening element is screwed into the threaded bore of the first housing part by its first threaded area, and via its screw head, or alternatively via a nut screwed onto a second threaded area of the fastening element, exerts pressure on the motor housing through whose threaded bore the fastening element is guided, the screw head and the nut being situated outside the recess and exerting pressure on the surface into which the bore hole in the motor housing part has been introduced. The placement in the peripheral angle positioning area covered by the projection allows a thin wall thickness outside the region of the projection, so that material can be saved and a stable and oil-tight development of the gear unit that is low in mass is able to be realized since a reinforcement is required only in the area of the projection; however, this region features the recess for the feedthrough of the fastening element, which has a weight-reducing effect.

In one advantageous development, the round flange, the square flange and the connection section of the first housing part are developed in one piece, i.e., in an integral fashion, which advantageously allows an uncomplicated production.

In one advantageous development, the square flange of the first housing part touches the square flange of the second housing part. This is advantageous insofar as a rectangular or square hole pattern is easy to provide on the gear unit, and the second housing part can be developed as a parallelepiped block, in particular its hole pattern for the connection of additional devices or for fastening the gear unit to the wall in a rectangular or square shape. The individual connection is therefore able to be implemented on a square surface.

In one advantageous development, the connection section is hollow, which has the advantage that a toothed component is able to be surrounded by the connection section in the manner of a housing. The inputting gear unit stage may therefore be placed within the hollow space.

In one advantageous development, the associated hollow space runs in continuous fashion from the motor to the second housing part. This is advantageous insofar as the lubricating oil of the gear unit interior penetrates the interior space of the first and second gear unit housing parts, so that the input and output stages are able to be lubricated.

In one advantageous development, the hollow space of the first housing part terminates at its first end region in a recess of the round flange of the first housing part, and at its other end region in a recess of the square flange of the first and/or second housing part. This has the advantage that the first housing part can be mounted on a rotative electric motor on the one hand, and on an essentially parallelepiped-shaped gear unit on the other, or on a gear unit whose hole pattern for connecting or fastening devices is developed in the a parallelepiped or square shape.

In one advantageous development the radial clearance from the rotor shaft axis covered by the round flange is greater than the radial clearance covered by the projections of the connection section. This is advantageous insofar as the greatest radial clearance of the round flange thus is greater than the greatest radial clearance of the projections. As a result, the connection section can be placed between the round flange and square flange in the form of a constriction on the first housing part. The connection section includes a recess, which is radially situated in the radial clearance region covered by the round flange and guided through the wall of the connection section. The radial clearance region covered by the wall of the connection section thus overlaps the radial clearance region covered by the round flange. The radial extension of the projections of the connection section is actually smaller than that of the round flange, whereas the radial extension of the projections of the connection section is greater than the inner diameter of the round flange, since the hollow space of the second housing part terminates in a circular or cylindrical opening featuring this particular inner diameter in the direction of the motor.

In one advantageous development, the wall thickness of the connection section is thicker in the region of an individual projection, the individual peripheral angle of the maximum thickening, especially the locally maximum thickening, corresponding to the individual peripheral angle of the maximum thickening, in particular the locally maximum thickening. This is advantageous insofar as the individual fastening element can be placed in the thicker region of the wall of the connection section, so that a recess is able to be provided in a material-saving manner.

In one advantageous development, the fastening element is a screw having a screw head, or a set screw having a screwed-on nut, the nut or screw head in particular pressing on the flange of the motor. This has the advantage that a simple and tight connection of the housing parts can be realized.

In one advantageous development, the greatest radial clearance of the individual projection extending in the axial direction is independent of the axial position, in particular in an axial section, the axial position in particular being situated in an axial section that covers more than one tenth, in particular more than three tenth, of the axial region covered by the connection section. This is advantageous insofar as the projections extend in the axial direction, so that the recess for the individual fastening element can be accommodated in a material- and space-saving manner in the thickened region of the wall, which extends in the axial direction, just like the projection.

In one advantageous development, the amplitude defined by the individual projection and the depressions adjacently disposed along both sides in the circumferential direction is greater than the thinnest wall thickness of the connection section. This has the advantage that the recess for the fastening element is situated at a smaller radial clearance than the radial clearance of the respective adjacent depression. A thin wall thickness is therefore able to be realized at an amplitude of the wavelike projections and depressions that is greater than the wall thickness.

In one advantageous development, the extension direction of the projections is parallel to the direction of the rotor shaft axis. This has the advantage that the fastening element can likewise be aligned in the axial direction and is therefore able to be placed in the reinforced region of the wall thickness that extends parallel to the extension direction of the projection.

In one advantageous development, the projections alternate with the depressions in a wavelike pattern in the circumferential direction. This advantageously achieves a pleasant design by the wavelike characteristic, and water is draining in addition. This not only applies to one installation orientation of the gear unit, but to a plurality of different installation orientations.

The radial clearance from the rotor shaft axis covered by the round flange is greater than the radial clearance covered by the projections and depressions. This is advantageous insofar as the fastening bore is able to be introduced into the round flange and thus can be placed in the radial clearance region covered by the round flange. The projections nevertheless have a smaller radial extension than the round flange. This makes it possible to develop the connection section in the most compact manner possible, and the gear unit can therefore be realized in a material-saving manner.

Further advantages are derived from the dependent claims. The present invention is not restricted to the feature combination of the claims. Those skilled in the art will discover additional meaningful possibilities for combining claims and/or individual claim features and/or features of the specification and/or of the figures, that arise from the stated objective and/or the objective resulting from a comparison with the related art, in particular.

BRIEF DESCRIPTION OF THE DRAWINGS

FIG. 4 shows a cross-section through first housing part 1, in particular through the linking connection section of housing part 1 that is interposed between the square flange and the round flange.

DETAILED DESCRIPTION

Figure 1:
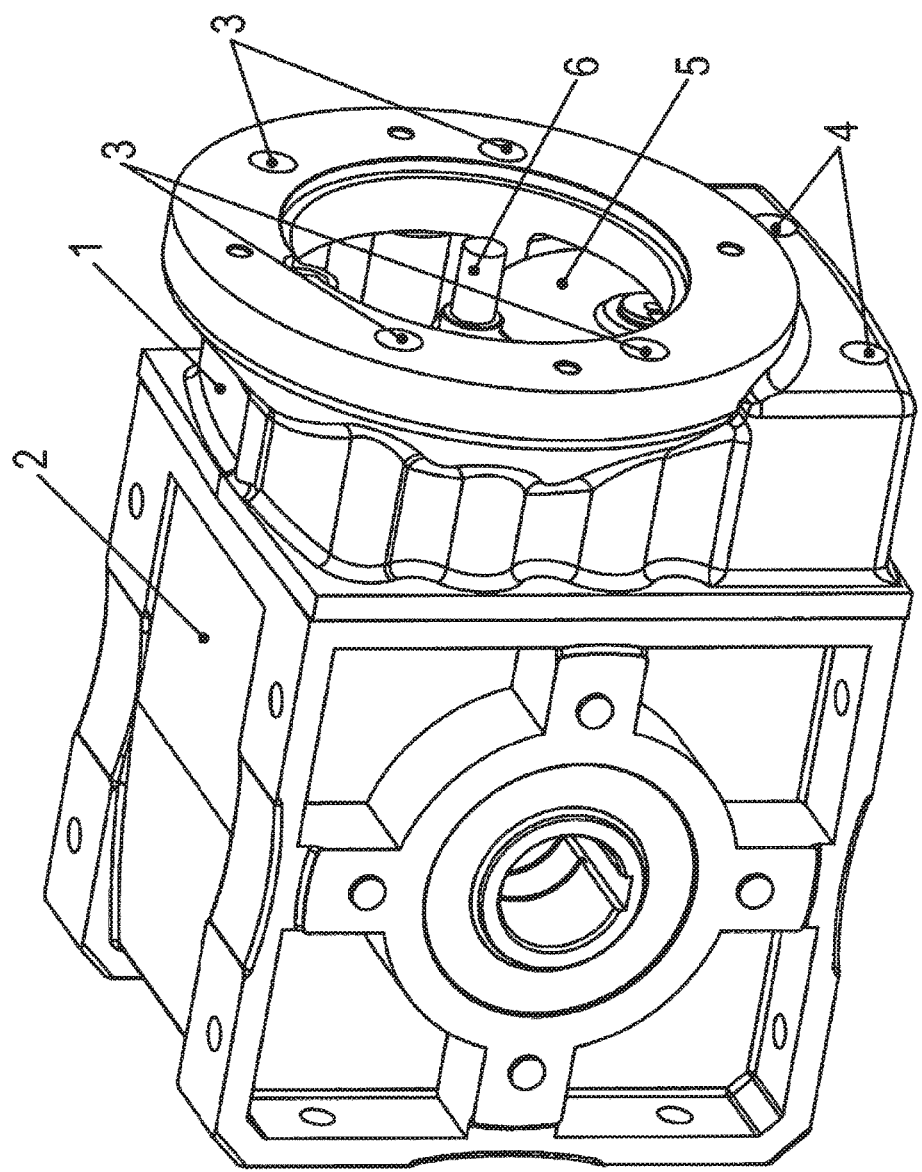
FIG. 1 schematically shows an oblique view of a gear unit housing which is made up of a first and a second housing part (1, 2), the two housing parts (1, 2) having a square flange in each case and the two square flanges touching and lying against one another.
Figure 2:
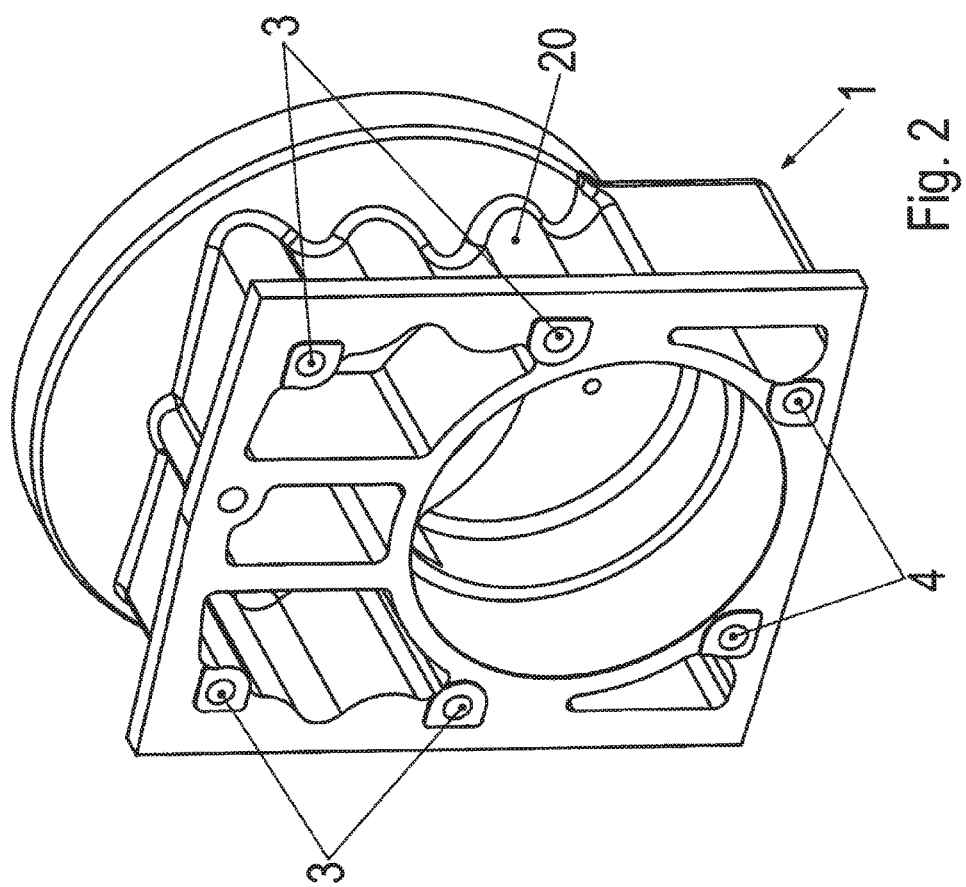
FIG. 2 shows first housing part 1 in an oblique view in a viewing direction toward the square flange.
Figure 3:
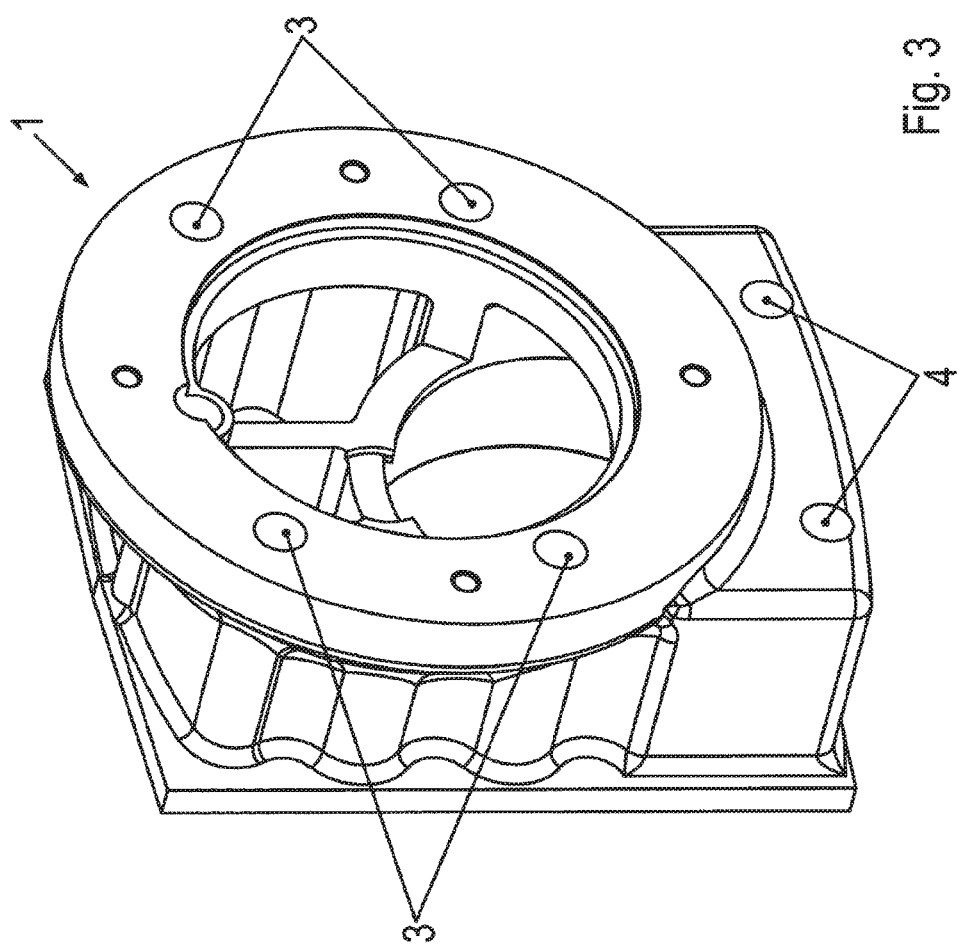
FIG. 3 shows first housing part 1 in an oblique view in a viewing direction toward a round flange situated axially opposite from the square flange.

As illustrated in the figures, the gear unit has a first housing part 1 and a second housing part 2, the first housing part surrounding a pre-stage, i.e., the input gear stage of the gear unit, in the way of a gear housing, and the second gear housing surrounding an output stage, i.e., the output gear stage of the gear unit, in the manner of a housing.

First housing part 1 thus accommodates input shaft 6, on which a toothed part which meshes with a further toothed wheel 5 of the input gear stage is situated in a torsionally fixed manner.

The square flange of the first housing part is aligned parallel to the round flange of first housing part 1, and an electric motor with its flange is able to be mounted on the round flange. The rotor shaft axis of the electric motor is parallel to the direction of the surface normal of the contact surface between the round flange and the flange of the motor, and also parallel to the direction of the surface normal of the contact surface between the square flange of the first and second housing part (1, 2). The round flange and the square flange of first housing part 1 are set apart from each other in the axial direction of the rotor shaft axis of the electric motor.

The motor flange, i.e., the flange of the electric motor, lies against the round flange of first housing part 1 and is fixed in place on the gear unit with the aid of fastening means, in particular screws. The fastening means, in particular screws, are fed through an uninterrupted recess in the flange and through an uninterrupted recess in first housing part 1, i.e., through first through-holes 3, in particular fastening screws, and screwed into a threaded bore in second housing part 2. The drill pattern of the threaded bores is introduced into the square flange of second housing part 2.

The screw head of each fastening means exerts pressure on a surface section of the flange of the electric motor facing away from the gear unit and thus presses the flange onto first housing part 1, which in turn is pressed against second housing part 2.

First housing part 1 includes a connection section, which is situated between the square flange and the round flange of the first housing part and thereby connects them.

The connection section is hollow, so that the toothing parts of the input stage are at least partially surroundable in a housing-forming manner.

The connection section has a wavelike structure on its surface when viewed in the circumferential direction. The projections and depressions of the wavelike structure are provided in the radial direction, i.e., pointing toward the outside.

The wall thickness of the connection section in the circumferential direction is variable accordingly. Each projection 20 in the radial direction thus is associated with a thickening of the wall thickness.

The continuous recesses through first housing part 1 in the axial direction provided for the feedthrough of the fastening means, especially screws, are located in the region of an individual thickening of the wall in each case, i.e., in a region having a greater wall thickness.

First housing part 1 not only has the mentioned first recesses, i.e., through-holes 3, but also second through-holes 4, which are provided for additional fastening means.

A local maximum of the maximum extension of the connection section, measured in the transverse direction with respect to the direction of the rotor shaft axis or measured in the radial direction, thus corresponds to each projection 20.

Projections 20 extend in the axial direction, i.e., parallel to the direction of the rotor shaft axis, so that projections 20 run from the round flange to the square flange of first housing part 1.

The radial clearance from the rotor shaft axis covered by the round flange is greater than the radial clearance covered by projections 20.

First and second housing parts (1, 2) have a separate bearing seat to accommodate a bearing of a shaft of the gear unit. It is even possible to provide a lubricant cover on the first or second housing part (1, 2), so that the oil level can be ascertained after the cover has been removed, and/or oil can be drained or replenished. A shaft is able to be accommodated in the housing part (1, 2) with the aid of the bearing seat, and the corresponding lateral forces can be diverted via the individual housing part (1, 2) as well. Since the fastening screws are placed so as to penetrate first housing part 1, they are also protected from corrosion.

In one further exemplary embodiment according to the present invention, threaded pins are used instead of the screws, which are screwed into threaded bores of second housing part 2, and onto whose end region facing away from the second housing part a nut replacing the screw head is screwed, which exerts pressure on the flange of the electric motor.

LIST OF REFERENCE NUMERALS 1 first housing part, in particular the pre-stage housing
2 second housing part, in particular the output stage housing
3 first through-holes for fastening means, in particular fastening screws
4 second through-holes for fastening means, in particular fastening screws
5 toothed wheel of the input stage
6 input shaft
20 projection in the transverse direction

The invention claimed is:

1. A gear unit motor, comprising:
a gear unit;
an electric motor which drives the gear unit, wherein:
the electric motor includes a rotor shaft which is situated so as to allow a rotation about a rotor shaft axis,
the gear unit includes a first housing part and a second housing part,
the second housing part includes a square flange,
the first housing part includes a round flange facing the motor and a square flange facing the second housing part,
the round flange and the square flange of the first housing part are connected by an interposed connection section of the first housing part,
the connection section of the first housing part includes individual projections in one surface section;
an individual fastening element screwed into a threaded bore introduced into the square flange of the second housing part and pressing a motor housing onto the first housing part, so that the fastening element presses against the second housing part, wherein:
the fastening element is provided in a recess that extends in uninterrupted fashion from the round flange of the first housing part to the square flange of the first housing part, and
the fastening element is situated in a peripheral angle region, covered by one of the individual projections, in the same circumferential position.

2. The gear unit motor as recited in claim 1, wherein the square flange of the first housing part faces the square flange of the second housing part.

3. The gear unit as recited in claim 1, wherein the projections extend parallel to a direction of the rotor shaft axis when viewed in a circumferential direction from the round flange to the square flange of the first housing part.

4. The gear unit as recited in claim 1, wherein the fastening element is situated in the same circumferential position (a) relative to the rotor shaft axis and/or (b) when viewed from a direction of the rotor shaft axis.

5. The gear unit motor as recited in claim 1, wherein the round flange, the square flange, and the connection section of the first housing part are developed as a single piece.

6. The gear unit motor as recited in claim 1, wherein the square flange of the first housing part touches the square flange of the second housing part.

7. The gear unit motor as recited in claim 1, wherein the connection section has a hollow design.

8. The gear unit motor as recited in claim 7, wherein at least one of:
a hollow space of the hollow design runs in uninterrupted fashion from the motor to the second housing part, and
the hollow space terminates in a recess of the round flange of the first housing part at a first end region of the hollow space, and in a recess of the square flange of at least one of the first housing part and the second housing part at another end region of the hollow space.

9. The gear unit motor as recited in claim 1, wherein a radial clearance, covered by the round flange, from the rotor shaft axis is greater than a radial clearance covered by the projections of the connection section.

10. The gear unit motor as recited in claim 1, wherein:
a wall thickness of the connection section is thicker in a region of an individual projection.

11. The gear unit motor as recited in claim 1, wherein:
the fastening element is one of a screw having a screw head and a set screw having a screwed-on nut, and
one of the nut and the screw head presses on a flange of the motor.

12. The gear unit motor as recited in claim 1, wherein an amplitude defined by at least one of the individual projections and depressions situated next to each other on both sides in the circumferential direction is greater than a thinnest wall thickness of the connection section.

13. The gear unit motor as recited in claim 12, wherein the individual projections alternate with the depressions in a wavelike manner in the circumferential direction.

14. The gear unit motor as recited in claim 1, wherein an extension direction of the individual projections is parallel to a direction of the rotor shaft axis.

15. The gear unit motor as recited in claim 1, wherein the first and the second housing parts each have a bearing seat to accommodate at least one of a bearing of a shaft of the gear unit and a lubricant oil cover.

16. The gear unit motor as recited in claim 1, wherein a radial clearance from the rotor shaft axis, covered by the round flange, is greater than a radial clearance covered by the individual projections.

* * * * *